United States Patent
Kurata

(10) Patent No.: US 7,748,774 B2
(45) Date of Patent: Jul. 6, 2010

(54) VEHICLE BODY STRUCTURE

(75) Inventor: Hidetoshi Kurata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 12/163,239

(22) Filed: Jun. 27, 2008

(65) Prior Publication Data

US 2009/0001769 A1    Jan. 1, 2009

(30) Foreign Application Priority Data

Jun. 28, 2007    (JP)    ............................. 2007-170975

(51) Int. Cl.
    *B62D 21/00*    (2006.01)
(52) U.S. Cl. .............. 296/187.08; 296/204; 296/193.07
(58) Field of Classification Search ............ 296/187.08, 296/187.09, 193.07, 203.1, 204; *B62D 21/00*
    See application file for complete search history.

(56) References Cited

U.S. PATENT DOCUMENTS

| | | | | |
|---|---|---|---|---|
| 2,108,215 A * | 2/1938 | Stief et al. ............. | 296/203.01 |
| 2,230,448 A * | 2/1941 | Best .......................... | 296/204 |
| 2,389,907 A * | 11/1945 | Helmuth ................ | 296/203.01 |
| 2,431,524 A * | 11/1947 | Lindsay et al. ............... | 296/204 |
| 2,613,986 A * | 10/1952 | Heyl, Jr. ..................... | 296/204 |
| 2,627,426 A * | 2/1953 | Toneray et al. ............... | 280/781 |
| 2,646,991 A * | 7/1953 | Dangerfield et al. ........ | 280/794 |
| 3,021,172 A * | 2/1962 | Fiala et al. ............. | 296/193.01 |
| 3,617,087 A * | 11/1971 | Hiramatsu ............. | 296/203.04 |
| 4,865,378 A * | 9/1989 | Filtri et al. ............. | 296/193.07 |
| 5,002,333 A * | 3/1991 | Kenmochi et al. .......... | 296/204 |
| 5,129,700 A * | 7/1992 | Trevisan et al. ........ | 296/193.07 |
| 5,788,322 A * | 8/1998 | Wolf et al. ............... | 296/181.4 |
| 5,806,918 A * | 9/1998 | Kanazawa .................. | 296/204 |
| 6,793,276 B2 * | 9/2004 | Sugihara et al. ............. | 296/204 |
| 7,097,238 B2 * | 8/2006 | Fujita .................... | 296/193.07 |
| 7,178,861 B2 * | 2/2007 | Yamada et al. .............. | 296/204 |
| 7,188,893 B2 * | 3/2007 | Akasaka ..................... | 296/204 |
| 7,469,957 B1 * | 12/2008 | Boettcher ............. | 296/193.07 |

(Continued)

FOREIGN PATENT DOCUMENTS

EP    433903 A1 *    6/1991

(Continued)

*Primary Examiner*—Patricia L Engle
*Assistant Examiner*—Pinel E Romain
(74) *Attorney, Agent, or Firm*—Rankin, Hill & Clark LLP

(57) ABSTRACT

Provided is an automotive vehicle body structure which is light weight but demonstrates improved mechanical strength during a frontal or side collision. A pair of front side frames extend in a fore-and-aft direction in a mutually spaced relationship in a front part of a vehicle body, and a pair of floor frames having forward ends joined to rear ends of the corresponding front side frames, respectively, extend in the fore-and-aft direction. A first middle cross member is joined to intermediate parts of the floor frames and to lateral ends of side sills. A front cross member is joined to a front side of the first middle cross member, has a pair of lateral ends that are joined to inboard sides of the corresponding front side frames, and is arch shaped such that a fore-and-aft dimension of the front cross member diminishes from each side end toward a middle part.

10 Claims, 5 Drawing Sheets

U.S. PATENT DOCUMENTS

| | | | |
|---|---|---|---|
| 2003/0234557 A1* | 12/2003 | Bock et al. | 296/190.08 |
| 2006/0163914 A1* | 7/2006 | Kamura et al. | 296/193.07 |
| 2008/0258502 A1* | 10/2008 | Egawa et al. | 296/193.07 |
| 2008/0315629 A1* | 12/2008 | Abe et al. | 296/193.07 |
| 2009/0058142 A1* | 3/2009 | Park | 296/193.07 |

FOREIGN PATENT DOCUMENTS

| | | | |
|---|---|---|---|
| JP | 57201777 A | * | 12/1982 |
| JP | 60094873 A | * | 5/1985 |
| JP | 06144299 A | * | 5/1994 |
| JP | 2002-302071 | | 10/2002 |

* cited by examiner

VEHICLE BODY STRUCTURE

TECHNICAL FIELD

The present invention relates to an automotive vehicle body structure which is light in weight but demonstrates an improved mechanical strength at the time of a frontal collision and a side impact.

BACKGROUND OF THE INVENTION

A monocoque vehicle body is typically fabricated by preparing a number of panel members and frame members by stamp forming steel sheet metal and joining them together by spot welding (see Japanese patent laid open publication No. 2002-302071). In a conventional vehicle body, the impact created by a frontal collision of the vehicle with another vehicle or a fixed structure is transmitted from the bumper to a pair of side front side frames extending in the fore-and-aft direction in a laterally spaced apart relationship. A part of the impact is then transmitted to side sill inners via corresponding outriggers while most of the impact is transmitted to a middle cross member via a right and left floor frame.

In the vehicle body structure disclosed in the aforementioned patent publication, a central part of the floor panel bulges upward to accommodate a fuel tank under it, and the fuel tank is received in a space defined by a front cross member, the middle cross member and floor frames. To the upper surface of the floor panel are attached the front and rear legs of seat frames that support the front seats.

In such a vehicle body structure, because the impact load transmitted by the front side frames is in most part applied to the floor frames, the floor frames are required to have large cross sectional areas and/or made of relatively thick steel sheets so that they add a significant weight to the overall weight of the vehicle body. An increased vehicle weight is obviously not desirable as it adversely affects the fuel economy and driving performance of the vehicle. It has therefore been desired to more effectively distribute the impact load transmitted to the front side frames to frame members other than the floor frames.

The vehicle body structure disclosed in the aforementioned patent publication suffers from an additional disadvantage. When a side impact is applied to a front part of the vehicle body, the impact load applied from the corresponding side sill inner is transmitted to the front cross member. Therefore, if the fuel tank is located under the floor panel, the front cross member is required to be reinforced by using thicker steel sheets, and this also contributes to the increase in the weight of the vehicle body.

At the time of a frontal impact, the vehicle occupant is thrown forward under an inertia force while restrained by a seat belt. As a result, the front part of the vehicle seat receives a significant downward force, and this may cause a downward deflection of the floor panel to which the front legs of the seat frames are attached. Such a downward deflection of the floor panel must be controlled because the head of the vehicle occupant may be brought too close to the dashboard panel. This necessitates a floor panel having a relative large section modulus and using a relatively thick steel sheet. This again adds to the increase in the weight of the vehicle body, and makes the stamping work more difficult.

BRIEF SUMMARY OF THE INVENTION

In view of such problems of the prior art, a primary object of the present invention is to provide an improved automotive vehicle body structure which is light in weight but demonstrates an improved mechanical strength at the time of a frontal collision and a side impact.

According to the present invention, such an object can be accomplished by providing a vehicle body structure, comprising: a pair of front side frames extending in a fore-and-aft direction in a mutually spaced relationship in a front part of a vehicle body; a floor panel defining a floor of a vehicle cabin; a pair of side sills joined to either side edge of the floor panel; a pair of floor frames having forward ends joined to rear ends of the corresponding front side frames, respectively, and extending in the fore-and-aft direction; a first middle cross member joined to the floor frames in intermediate parts thereof and to the side sills at lateral ends thereof; a second middle cross member located in a rearwardly spaced relationship to the first middle cross member, and joined to the floor frames in intermediate parts thereof and to the side sills at lateral ends thereof; and a front cross member joined to a front side of the first middle cross member and having a pair of lateral ends that are joined to inboard sides of the corresponding front side frames; wherein the front cross member is provided with an arch shape such that a fore-and-aft dimension of the front cross member diminishes from each side end thereof toward a middle part thereof.

According to this arrangement, the impact load transmitted to the front side frames is effectively transmitted to the floor frames and side sills via the front cross member and first middle cross member. Therefore, the requirement for the mechanical strength of the floor frames is reduced, and the floor frames may consist of relatively light-weight members so that the overall weight of the vehicle body can be reduced. Also, because the first middle cross member opposes the deformation of the front part of the cabin in the lateral direction, the safety of the vehicle occupant at the time of a crash is enhanced.

According to a preferred embodiment of the present invention, the vehicle body structure further comprises a floor panel stiffener joined to the floor panel and extending centrally in the fore-and-aft direction between the first middle cross member and second middle cross member. The load applied to the first middle cross member is supported by the floor panel stiffener so that the weight of the floor panel can be further reduced without compromising the resistance of the cabin to deformation. Similar advantages can be gained by providing a pair of outriggers each extending laterally between the front side frame and the front end of the side sill on the corresponding side. In particular, each outrigger may be provided with a rearwardly swept back front edge that extends from the corresponding front side frame to the front end of the corresponding side sill.

The vehicle body structure may further comprise a seat frame having a front end attached to the first middle cross member. In this case, at the time of a frontal crash, because the front legs of the seat frames are attached to the first middle cross member, the deformation of the seat frame owing to the downward force applied to the seat frames by the inertia force acting on the vehicle occupant in the seat is minimized, and the vehicle occupant is prevented from coming undesirably close to the dashboard.

According to another aspect of the present invention, a fuel tank is received in a rectangular space defined by the first and second middle cross members and floor frames so that the safety of the fuel tank against impact situations can be improved.

Also, the front side frames may be provided with oblique inboard edges which are progressively closer to each other toward rear ends thereof, and a front edge of the front cross member may define a concave shape that smoothly connects the oblique inboard edges of the front side frames.

According to a particularly preferred embodiment of the present invention, the front cross member is provided with a substantially straight rear edge which is attached to the first middle cross member, and the front cross member forms a closed cross section in cooperation with a front part of the floor panel and the first middle cross member.

The floor panel may comprise a front part and a rear part that are joined to each at the first middle cross member so that the thickness and/or material (using high-tension steel as opposed to normal steel) of the front part may be made different from those of the rear part so that the stamp forming efficiency or other fabrication efficiency may be improved.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
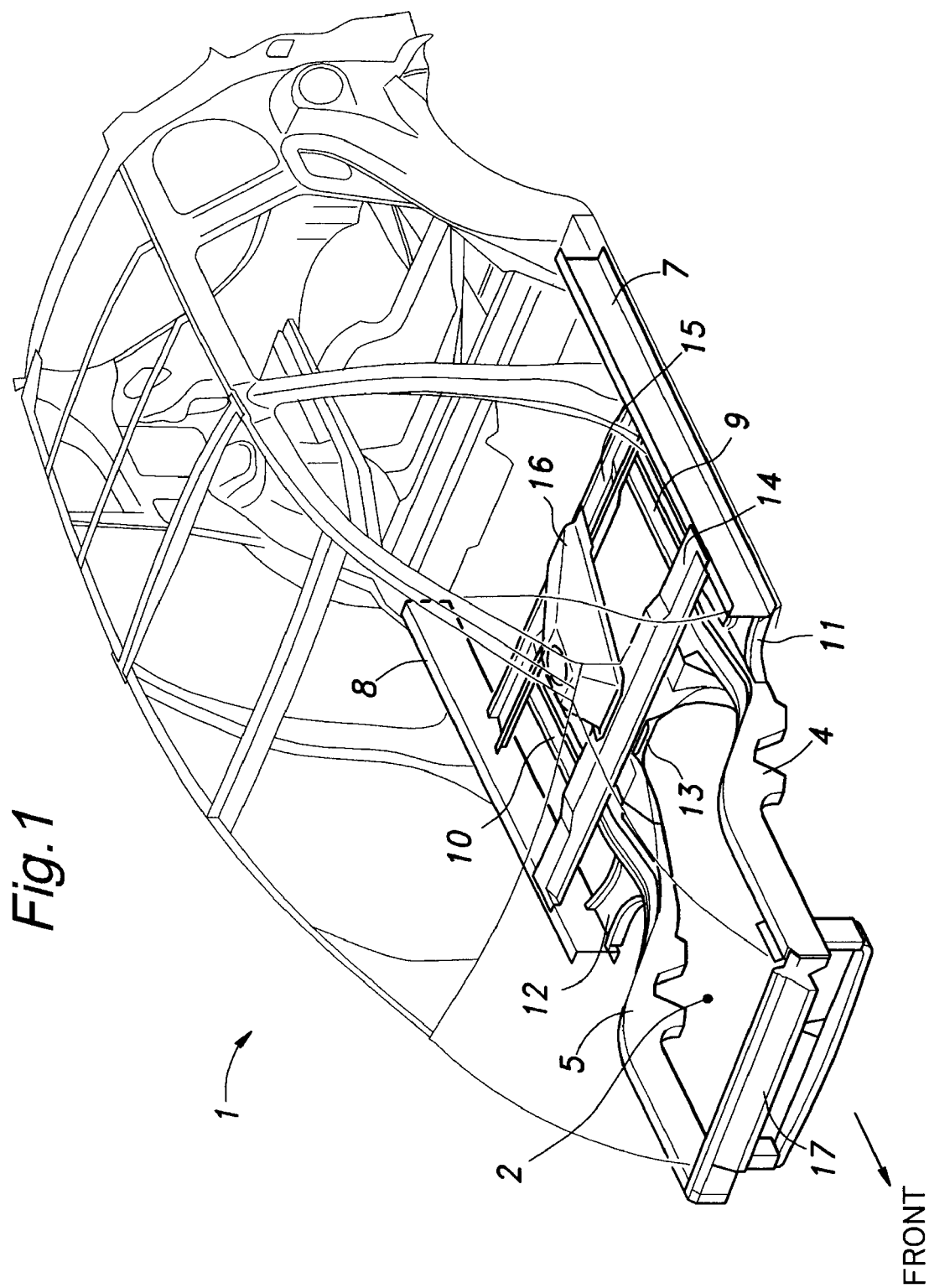
FIG. 1 is a perspective see-through view of a vehicle body structure embodying the present invention.
Figure 2:
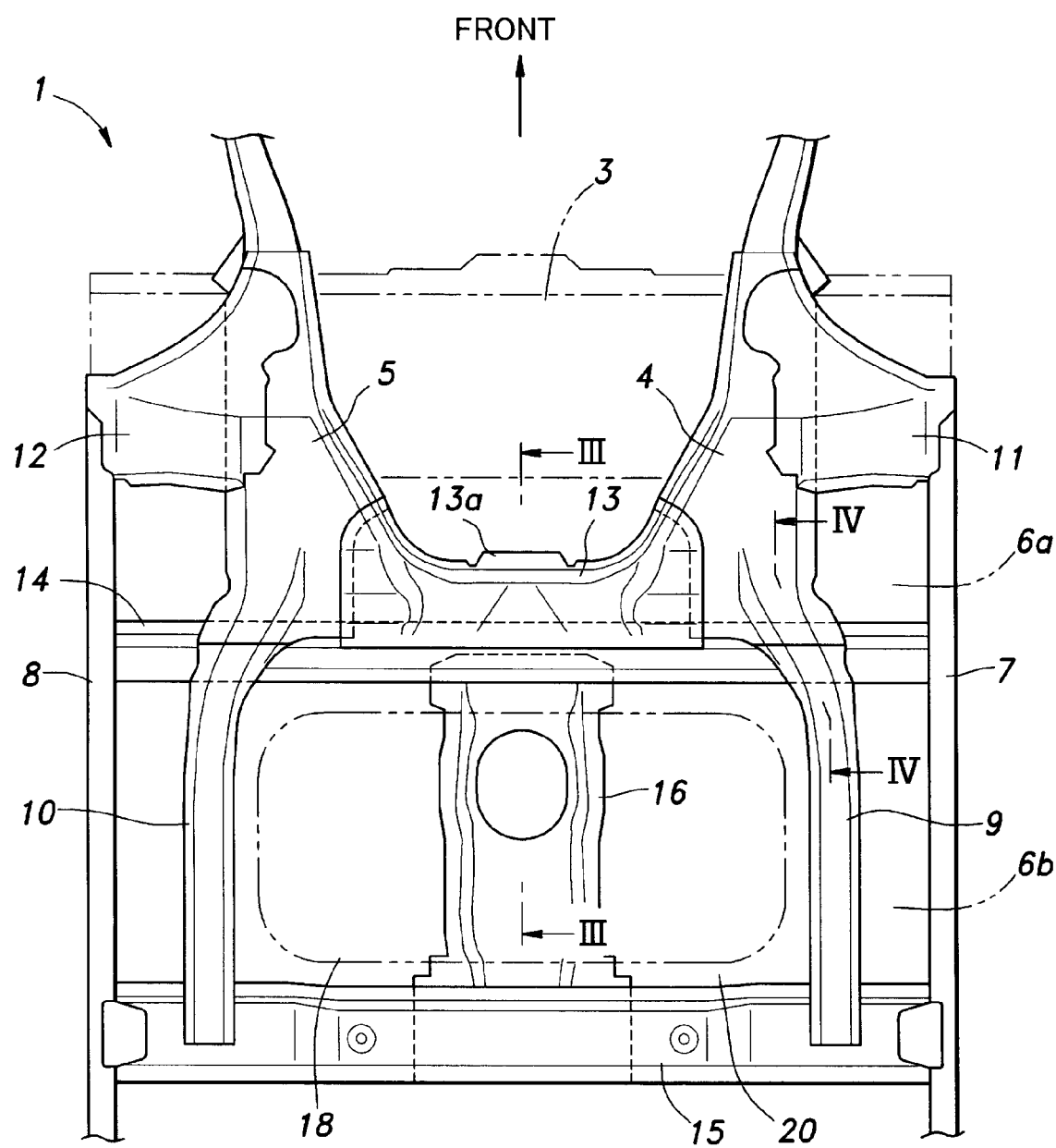
FIG. 2 is a bottom view of the vehicle body structure according to the present invention.
Figure 3:
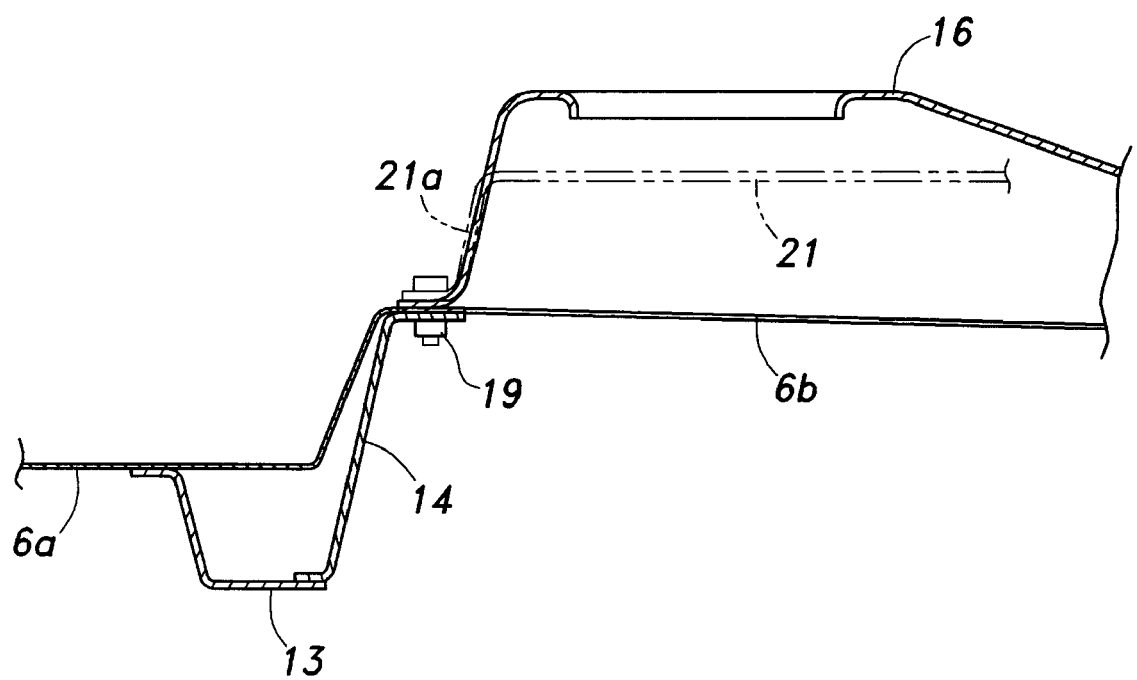
FIG. 3 is a sectional view taken along line III-III of FIG. 2.

The embodiment illustrated in FIGS. 1 to 3 is directed to a hatch back passenger vehicle. The vehicle body 1 comprises various body panels including dashboard lower panel 3 defining a front end portion of a cabin and a front and rear floor panel 6a and 6b forming the floor of the cabin, and various frame members including a right and left front side frame 4 and 5, a right and left side sill inner (side sill) 7 and 8, a right and left floor frame 9 and 10, a right and left outrigger 11 and 12, a front cross member 13, a first middle cross member 14, a second middle cross member 15 and a floor tunnel stiffener 16. Numeral 17 in FIG. 1 denotes a bumper beam attached to the front ends of the front side frames 4 and 5. Numeral 18 in FIG. 2 denotes a fuel tank placed centrally under the vehicle body 1, and is received in a space defined by the first and second middle cross members 14 and 15 and floor frames 9 and 10.

The front side frames 4 and 5 extend in the fore-and-aft direction from an engine room 2 to the front floor panel 6a (not shown in FIG. 1). The side sill inners 7 and 8 are attached to the lateral outboard edges of the front and rear floor panels 6a and 6b (not shown in FIG. 1), respectively, and form a part of the cabin floor. The floor frames 9 and 10 are attached to the rear ends of the front side frames 4 and 5, respectively, and to the lower surface of the rear floor panel 6b. The outriggers 11 and 12 each consist of a laterally extending closed cross section member, and connect the front side frames 4 and 5 and the front ends of the corresponding side sill inners 7 and 8.

The front cross member 13 is connected to the inboard edges of the rear end portions of the right and left front side frames 4, 5, and is given with an arched shape defined by a concave front edge and a substantially straight rear edge. As a result, the fore-and-aft dimension of the front cross member 13 is made progressively smaller from each lateral end toward the middle portion thereof. As shown in FIG. 3, the front cross member 13 includes an upright wall 13a having an upper end which is attached to the lower surface of the rear end portion of the front floor panel 6a, and is attached to the lower surface of the front end portion of the first middle cross member 14 at a rear end thereof. Numeral 19 in FIG. 3 denotes welded nuts that are welded to the lower surface of the rear end portion of the first cross member 14 for the threaded fasteners that are to be used for securing front legs 21a of seat frames 21.

Figure 4:
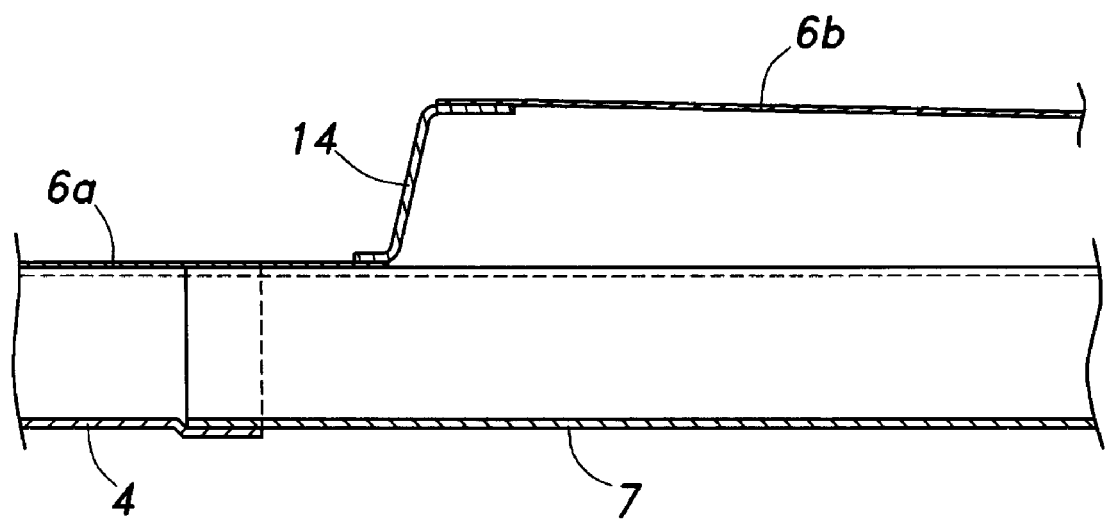
FIG. 4 is a sectional view taken along line IV-IV of FIG. 2.

As shown in FIG. 3, the front side of the first middle cross member 14 is connected to the rear end of the front floor panel 6a, and the rear side of the middle part of the first middle cross member 14 is connected to the front end of the floor tunnel stiffener 16 via the rear floor panel 6b. Further, as shown in FIG. 4, the lateral ends of the first middle cross member 14 are connected to the front side frames 4 and 5, respectively, via the rear end of the front floor panel 6a, and the rear end thereof is connected to the front end of the rear floor panel 6b.

Figure 5:
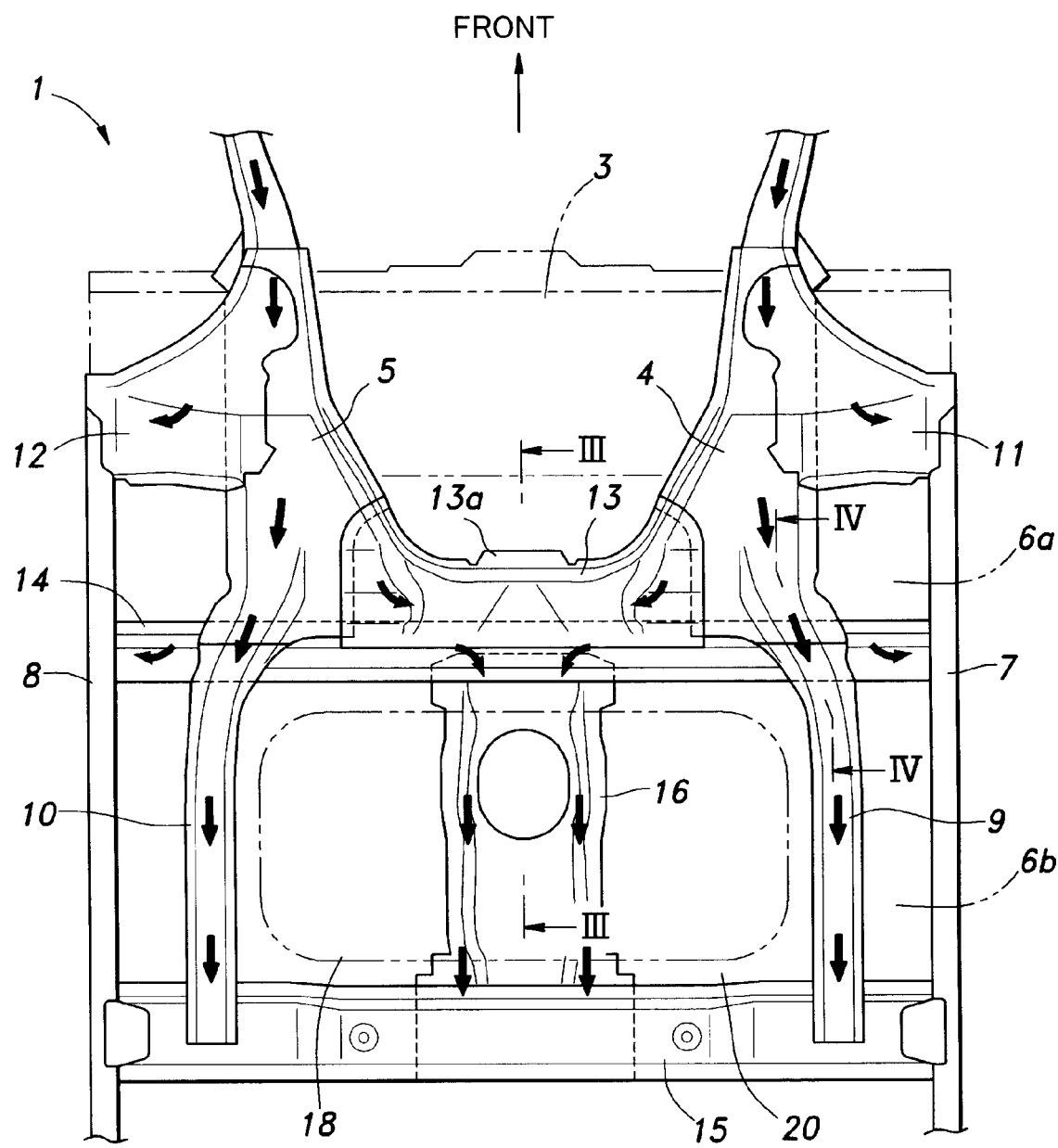
FIG. 5 is a view similar to FIG. 2 showing the paths along which the impact load is transmitted to various parts of the vehicle body.

Suppose that the front end of the vehicle body 1, which may be either traveling or stationary, has collided with a vehicle or a fixed object (or a frontal crash has occurred). As indicated by the bold arrows in FIG. 5, the impact load transmitted from the bumper beam 17 and the front side frames 4 and 5 is partly transmitted to the side sill inners 7 and 8 via the outriggers 11 and 12. respectively, but is mostly transmitted to the floor frames 9 and 10. The impact load transmitted to the floor frames 9 and 10 is then transmitted directly to the first middle cross member 14 along the upper surfaces of the floor frames 9 and 10. The impact load transmitted to the floor frames 9 and 10 is also transmitted to the first middle cross member 14 via the front cross member 13 and to the side sill inners 7 and 8 and floor tunnel stiffener 16 via the first middle cross member 14. In this conjunction, because of the arch-shape of the front cross member 13, a localized application of the impact load onto the first middle cross member 14 can be avoided, and an excessive transmission of the impact load to the floor tunnel stiffener 16 is controlled.

At the time of a frontal crash, the vehicle occupant restrained by a seat belt is thrown forward by an inertia force, and this causes a significant downward force to be applied to the front part of the seat. However, in the illustrated embodiment, the front legs 21a of the seat frame 21 are attached to the parts where the first middle cross member 14 and floor tunnel stiffener 16 are laid one over the other so that the displacement of the seat frame 21 is minimized. Therefore, the forward pitching over of the vehicle occupant is minimized, and this prevents the vehicle occupant from coming undesirably close to the dashboard.

Also, not only at the time of a frontal crash but also at the time of a side impact (caused by a collision of a vehicle onto a side of the vehicle body 1), the fuel tank 18 which is received in a reinforced space 20 defined by the first and second middle cross members 14 and 15 and floor frames 9 and 10 is protected from deformation and damages, and this enhances the safety of the vehicle. In the case of a battery-powered vehicle (which may also be a hybrid vehicle) or a fuel cell powered vehicle, the protected space 20 may be used for receiving batteries or fuel cells, instead of a fuel tank, to afford an improved protection.

According to the illustrated embodiment, owing to the structure thereof described above, the floor frames 9 and 10 and front cross member 13 may be made of relatively thin and light-weight steel sheets while ensuring an adequate mechanical strength and rigidity so that the weight of the vehicle body can be reduced, and the NVH (noise, vibration and harshness) performance can be improved. Because the floor panel may consist of two separate pieces, the front floor panel 6a and rear floor panel 6b, that are separated by the first middle cross member 14, the thickness and/or material (using high-tension steel as opposed to normal steel) of the front part may be made different from those of the rear part so that the stamp forming efficiency or other fabrication efficiency may be improved. Also, because the front cross member 13 and/or first middle cross member 14 provide an adequate mechanical strength and rigidity to the front part of the cabin, the front floor panel 6a may not be formed with a floor tunnel section extending centrally in the fore-and-aft direction so that a walk-through cabin floor (that enables a vehicle occupant to walk from a driver seat to a passenger seat) can be achieved.

Although the present invention has been described in terms of preferred embodiments thereof, it is obvious to a person skilled in the art that various alterations and modifications are possible without departing from the scope of the present invention which is set forth in the appended claims. For instance, although the forgoing embodiment was directed to a four-door sedan, the present invention can be applied to other forms of vehicles such as two-door passenger vehicles. Also, the specific shapes of the floor frames, front cross member, first middle cross member and floor panels as well as how they are joined to one another may be modified without departing from the spirit of the present invention.

The contents of the original Japanese patent application on which the Paris Convention priority claim is made for the present application are incorporated in this application by reference.

The invention claimed is:

1. A vehicle body structure, comprising:
a pair of front side frames extending in a fore-and-aft direction in a mutually spaced relationship in a front part of a vehicle body;
a floor panel defining a floor of a vehicle cabin;
a pair of side sills joined to either side edge of the floor panel;
a pair of floor frames having forward ends joined to rear ends of the corresponding front side frames, respectively, and extending in the fore-and-aft direction;
a first middle cross member joined to the floor frames in intermediate parts thereof and to the side sills at lateral ends thereof;
a second middle cross member located in a rearwardly spaced relationship to the first middle cross member, and joined to the floor frames in intermediate parts thereof and to the side sills at lateral ends thereof; and
a front cross member joined to a front side of the first middle cross member and having a pair of lateral ends that are joined to inboard sides of the corresponding front side frames;
wherein the front cross member is provided with an arch shape such that a fore-and-aft dimension of the front cross member diminishes from each side end thereof toward a middle part thereof.

2. The vehicle body structure according to claim 1, further comprising a floor panel stiffener joined to the floor panel and extending centrally in the fore-and-aft direction between the first middle cross member and second middle cross member.

3. The vehicle body structure according to claim 1, further comprising a pair of outriggers each extending laterally between the front side frame and a front end of the side sill on the corresponding side.

4. The vehicle body structure according to claim 3, wherein each outrigger is provided with a rearwardly swept back front edge that extends from the corresponding front side frame to the front end of the corresponding side sill.

5. The vehicle body structure according to claim 1, further comprising a seat frame having a front end attached to the first middle cross member.

6. The vehicle body structure according to claim 1, further comprising a fuel tank received in a rectangular space defined by the first and second middle cross members and floor frames.

7. The vehicle body structure according to claim 1, wherein the front side frames are provided with oblique inboard edges which are progressively closer to each other toward rear ends thereof, and a front edge of the front cross member defines a concave shape that smoothly connects the oblique inboard edges of the front side frames.

8. The vehicle body structure according to claim 7, wherein the front cross member is provided with a substantially straight rear edge which is attached to the first middle cross member.

9. The vehicle body structure according to claim 1, wherein the front cross member forms a closed cross section in cooperation with a front part of the floor panel and the first middle cross member.

10. The vehicle body structure according to claim 1, wherein the floor panel comprises a front part and a rear part that are joined to each at the first middle cross member.

* * * * *